UNITED STATES PATENT OFFICE.

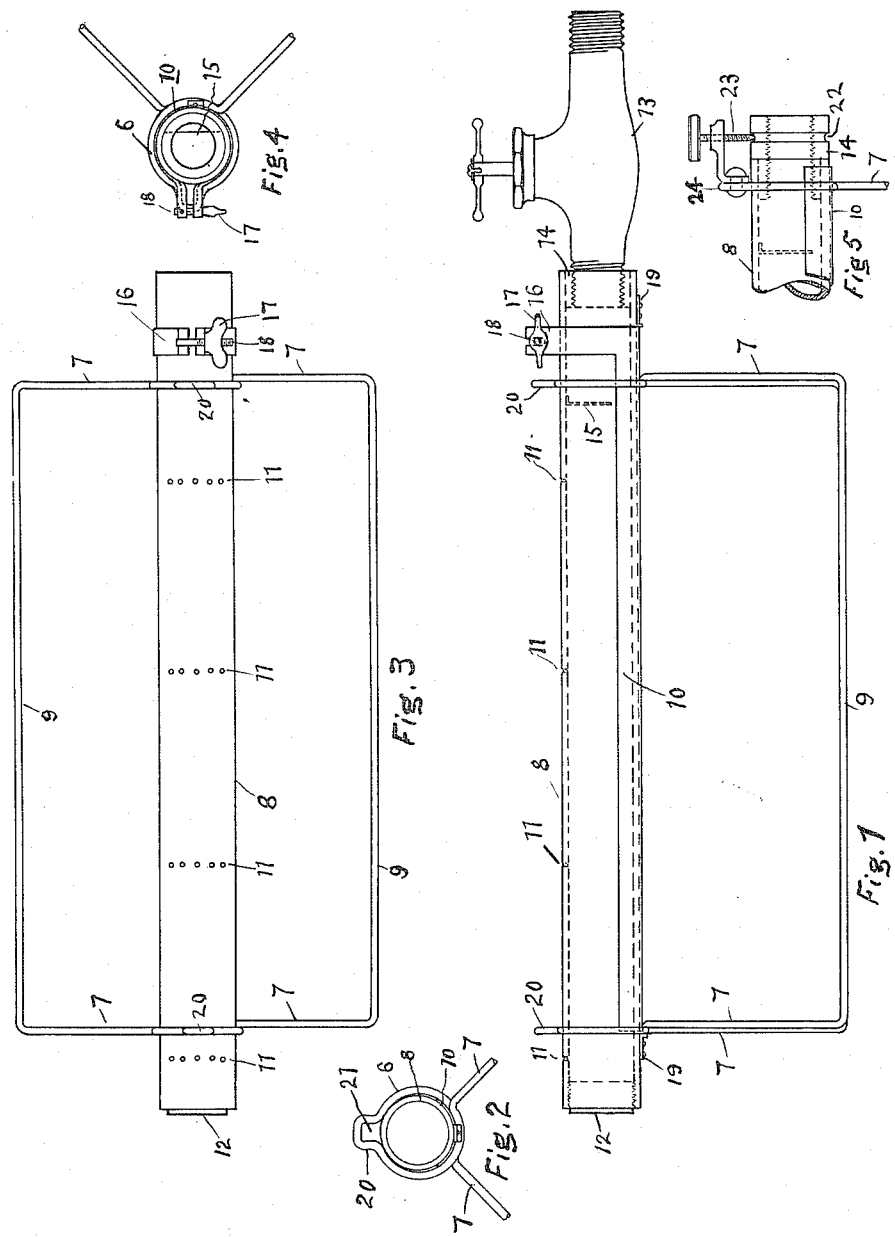

FRANK WINSLOW HOPKINS, OF SEATTLE, WASHINGTON.

LAWN-SPRINKLER.

1,049,483.

Specification of Letters Patent.

Patented Jan. 7, 1913.

Application filed August 7, 1911. Serial No. 642,677.

*To all whom it may concern:*

Be it known that, I, FRANK WINSLOW HOPKINS, a citizen of the United States, and resident of Seattle, in the county of King and State of Washington, have invented a new and useful Lawn-Sprinkler, of which the following is a specification.

My invention relates to improvements in lawn-sprinklers which are adapted to be attached to a garden hose of such a length as will permit the sprinkler to be moved from one position to another on a lawn, whereby water may be sprinkled over the whole area of such lawn; and the objects of my improvements are, first, to provide a sprinkler which shall operate to sprinkle water over a rectangular area instead of a circular area. second, to provide a sprinkler which shall be easily removable from one position to another on a lawn and, third, to provide a plan of construction whereby a sprinkler can be made at small cost and which shall be durable and easily manipulated. I attain these objects by devices illustrated in the accompanying drawings in which—

Figure 1 is a view in side elevation of my invention, Fig. 2 is a view in elevation of one end of the important parts of the same, Fig. 3 is a plan view of same, Fig. 4 is a view in elevation of the other end of my invention with one of its parts (a stop cock) removed while Fig. 5 illustrates a modification of some of the features of my invention.

Similar reference numbers indicate like parts throughout the drawings.

Referring to the drawings, a frame is constructed of iron or steel wire rod, preferably galvanized, formed to have a circular loop 6 at each end from which legs 7 may diverge downwardly to the ground where the two legs 7 on the same side of the loops 6 are connected together by a longitudinal continuation of the iron rod thus forming a stay-rod 9 to unite legs 7 of each side of the frame. The frame thus formed is adapted to receive within the loops 6 and support a length of pipe 8, said pipe 8 being of such size with relation to the size of loops 6 that such loops 6 with a spring-like action may grip the pipe 8 with a greater or lesser force in response to variations in the degree of divergance of the legs 7; thus when the legs 7 at each end of the frame are pressed nearer together then the pipe 8 may rest loosely within loops 6 and readily be turned by the hand but if legs 7 at each end be spread farther apart then loops 6 may grip the pipe 8 tightly to hold it fast. If desired a sheet-iron strip forming a cradle 10, of curved cross-section, may be disposed to rest within and extend between the loops 6 whereby the upward ends comprising the legs 7 and loops 6 would be stayed if for any reason it should be required to remove the pipe 8 or if it be desired to make the frame of greater stability. The pipe 8 is provided with numerous holes 11 suitably disposed along the side thereof and one end of said pipe 8 is closed by a plug 12 while the other end is adapted to connect with a water stock-cock 13, or a hose, by a bushing 14 which may be provided with a pipe-thread.

Fastened to the upper and inner side of pipe 8, at a little distance from the holes 11, which are located nearest the inlet end of said pipe 8, is a deflector 15 extending downward a suitable distance, as indicated by broken line in Fig. 1, the function of which deflector is to cause the water to rush more rapidly toward the holes 11 which are located farther from the inlet end of said pipe 8 whereby, as found by repeated experiments and by practical operations, such deflector 15 causes the water to be emitted from all the holes 11 with more nearly an equal force thus squirting all the water jets to a more nearly equal distance than would be the case if such deflector 15 be not employed.

When the cradle 10 is employed the pipe 8 may be gripped fast in a desired circumferential position by forming upon, or attaching to, an end of cradle 10 a clamp 16 adapted to surround and hug the end of the pipe 8 when a thumb-nut 17 is turned on a hinged screw 18, and a bracket 19 on the pipe near each end of the cradle 10 may serve to prevent a lengthwise movement of pipe 8 in the frame, and on the top of each of the circular loops 6 is an upward bulge or bend 20 forming an opening 21 whereby when pipe 8 is turned to a proper point it may be moved endwise and withdrawn from the frame, the bracket 19 passing through opening 21.

To operate my invention the sprinkler is disposed on the area of ground to be sprinkled whereupon a garden hose, leading from a source of water of a suitable pressure, is connected through the stop-cock 12 and water is then permitted to flow through the pipe 8 when the deflector 15 will cause the water to be spurted through the holes 11 with nearly equal force throughout the length of pipe 8. When the pipe 8 is disposed as shown in Fig. 3 the water is thrown over an area equally great on each side of the pipe 8 but the pipe 8 may be turned, by loosening the clamp 16, so that the water may be thrown wholly or partly to either side of the frame as desired but always the area sprinkled will be rectangular in form.

Fig. 5 shows a modified form of clamp for clamping the pipe 8 wherein the bushing 14 projects out of the end of pipe 8 and such bushing 14 is provided with a groove 22 around its circumference. A screw 23 supported by and extending through a lug 24 is adapted to engage with said groove 22 to hold pipe 8 in any desired circumferential position. The lug 24 is shown as being supported by being riveted to an upwardly projecting portion of a loop 6 on one end of the frame as shown in said Fig. 5. With such modification no bracket 19 will be required nor will a bulge or bend 20 be necessary.

What I claim is:

1. In a lawn-sprinkler of the class described, a supporting frame of continuous metal rod formed to have at each end a circular loop from which two supporting legs extend divergingly downward to the ground where a longitudinal continuation of said rod unites the two legs which are disposed on each and the same side of said loops, a sheet-iron strip, forming a cradle, disposed to extend between and unite said loops, a length of pipe one end of which is closed while its other end is adapted to connect with a source of water, sprinkler perforations suitably disposed in said pipe, a deflector suitably disposed in said pipe whereby the inrush of water may not have direct access to such of said perforations as are located nearer the inlet end of said pipe, and a groove surrounding one end of said pipe, in combination with a clamping screw associated with one of said loops which clamping screw is disposed and adapted to engage with said groove whereby said pipe may be secured in said frame in any desired circumferential position.

2. In a lawn-sprinkler of the class described the combination with a length of pipe provided with holes for sprinkling water, of a frame formed of wire rod to have supporting legs and elastic loops at each end, within which loops the said pipe may be disposed and held by a spring-like grip of said loops when said legs at each end of said frame are diverged to their normal position.

FRANK WINSLOW HOPKINS.

Witnesses:
ROGER WARD SHOTWELL,
J. T. WILMORE.